Figure 1:
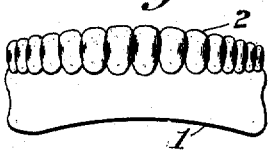

H. D. BEST.

DENTAL WORK.

APPLICATION FILED DEC. 11, 1908.

Reissued Feb. 14, 1911. 13,203.

WITNESSES

R. A. Balderson

G. L. Winters

INVENTOR

H. D. Best by Dickerson, Brown & Parmelee his attys

THE NORRIS PETERS CO., WASHINGTON, D. C.

UNITED STATES PATENT OFFICE.

HARRISON D. BEST, OF PITTSBURG, PENNSYLVANIA, ASSIGNOR TO THE H. D. BEST DENTAL MANUFACTURING COMPANY, OF PITTSBURG, PENNSYLVANIA, A CORPORATION OF DELAWARE.

DENTAL WORK.

13,203. Specification of Reissued Letters Patent. Reissued Feb. 14, 1911.

Original No. 838,296, dated December 11, 1906, Serial No. 298,497. Application for reissue filed December 11, 1908. Serial No. 467,115.

*To all whom it may concern:*

Be it known that I, HARRISON D. BEST, a citizen of the United States of America, residing at Pittsburg, in the county of Allegheny and State of Pennsylvania, have invented certain new and useful Improvements in Dental Work, of which the following is a specification, reference being had therein to the accompanying drawings.

This invention relates to certain new and useful improvements in dental work; and the invention relates more particularly to the construction, assembling, and manner of securing crown and bridge work in the mouth of a person and enabling the treating of diseased roots through the tooth-crown.

With the above and other objects in view the invention consists in the novel construction, combination, and arrangement of parts to be hereinafter more fully described and then specifically pointed out in the claims, and, referring to the drawings accompanying this application, like numerals of reference designate corresponding parts throughout the several views, in which:—

Figure 3:
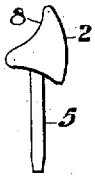
Figure 4:
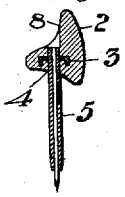
Figure 2:
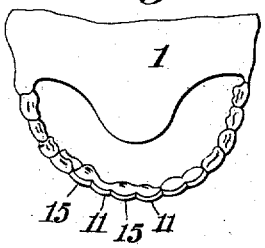
Figure 5:
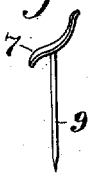
Figure 6:
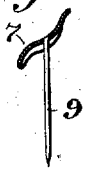
Figure 7:
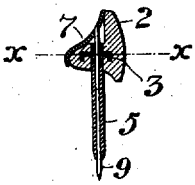
Figure 9:
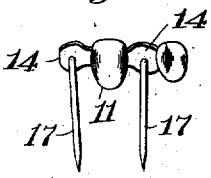
Figure 10:
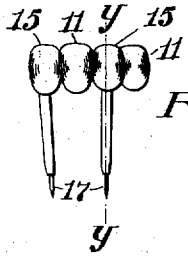
Figure 8:
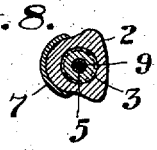
Figure 11:
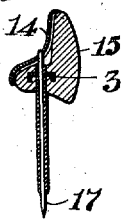

Figure 1 is a front elevation of a model supporting a bridge of false teeth. Fig. 2 is a plan of the same. Fig. 3 is a side elevation of a tooth-crown constructed in accordance with my invention. Fig. 4 is a vertical sectional view of the same. Fig. 5 is a side elevation of a detachable cap-backing adapted to be secured upon the tooth illustrated in Figs. 3 and 4 of the drawings. Fig. 6 is a vertical sectional view of the detachable cap-backing. Fig. 7 is a vertical sectional view of a tooth-crown equipped with a detachable cap-backing. Fig. 8 is a horizontal sectional view taken on the line *x x* of Fig. 7. Fig. 9 is a front elevation of a piece of bridgework constructed in accordance with my invention. Fig. 10 is a front elevation of the bridgework supported by two tooth-crowns. Fig. 11 is a vertical sectional view taken on the line *y y* of Fig. 10.

In the accompanying drawings the reference numeral 1 designates a mold or pattern made from the impression of a person's jaw, in which the false teeth 2 are set and secured. In practice I use porcelain for making the bodies of my tooth-crowns. The body of the crown has a centrally-placed vertical opening 4 through it, shaped to receive a tube 5, made of platinum or other metal or alloy, which will permit of the porcelain being baked around it. This tube is preferably cut off flush with the lingual surface of the body, although it may be cut squarely off, as shown in Figs. 4, 7 and 11 of the drawings. To strengthen the body of the tooth-crown, a ring 3 of appropriate metal (like tube) may be embedded and suitably secured in the body of the crown, such ring being attached to and encircling the tube, as shown in Figs. 4, 7, 8 and 11 of the drawings. The projecting tube 5 is to be cemented into the properly-prepared root to hold the completed tooth-crown in proper position relative to teeth and jaw.

In conjunction with each tooth-crown I use a backing, which I term a "cap-backing" 7, preferably made of gold, the cap-backing conforming to the contour of the lingual side 8 of the crowns. The cap-backing is provided with a pin 9, said pin being adapted to pass through the tube 5 and protrude, if desired. The end of pin 9, as well as the end 6 of tube 5, may be tapered when desired, as shown in the drawings. In practice, I provide the cap-backing with an opening 10, whereby after the cap-backing has been shaped to conform to the lingual contour of the tooth-crown the pin 9 may be inserted through the opening 10 to engage in the tube 5, at which time the end of the pin protruding above the cap-backing can be cut off and soldered in the opening 10. By this construction of the crown and the detachable cap-backing 7, as described, and the use of a removable cement in setting cap-backing the cap-backing can be easily and quickly removed at any desired time without necessitating the removal of the tooth-crown, it only being necessary to withdraw the cap-backing 7 and pin 9 from the tube 5. Thus we may, as is occasionally desired, crown a diseased root of a tooth, and after the crown is set in place continue to treat the diseased root through the hollow pin 5, as described.

Figs. 2, 9 and 10 illustrate the method of making a bridge by the aid of my tooth-crown. In practice the roots of the teeth which are to be crowned and serve as abutments for a bridge are prepared and fitted with my tooth-crowns (as 15 15) with pins (as 17 17) and metallic cap-backings (as 14 14) all as described above.

To the sides of the cap-backings carrying the pins 17 17 are now soldered any of the metallic backings in common use, the latter backings supporting the false teeth or facings desired, (as 11 11). These pins, cap-backings, ordinary backings, and facings together (see Fig. 9) may be used as removable bridge by fitting into place without cement or by the use of temporary cement, as gutta-percha, though ordinarily, a permanent bridge being desired, it will be set with permanent cement.

The above describes the preferable and complete bridge. It is possible, however, and may sometimes be desirable to omit some part.

It will of course be understood that a variable number of my crowns may be used with a variable number of facings, all arranged in any order as required by circumstances. Furthermore, my tooth-crown and bridge-work may be used in conjunction with any metallic or partially metallic crown when for any reason this may be desirable.

In addition, it will be observed that a bridge may be constructed as above and none of the metallic parts need show on the labial or buccal surface, (see Fig. 1,) a very valuable attribute of a bridge from the esthetic standpoint, especially in the front teeth.

My invention particularly resides in the combination of parts to make a new and improved crown for roots of teeth and the novel manner in which bridgework is constructed.

A very important advantage of the present invention resides in the fact that there are no external fastenings between the tube 5 and the crown 2, the securing together of these two elements being effected entirely by an internal connection. This connection is effected by providing the tube 5 with an area increasing portion, the present embodiment being that of a ring 3, the crown being molded around the ring and the adjacent portions of the tube and baked thereon.

What I claim, and desire to secure by Letters Patent, is—

1. The combination in a tooth-crown of a porcelain body, a strengthening-ring seated within the body and a metal tube baked into said body, and having an open outer end; substantially as described.

2. The combination in a tooth-crown of a porcelain body, a tube of metal baked into said body, a metal pin adapted to fit in said tube, said pin passing completely through the porcelain body, substantially as and for the purpose described.

3. The combination in a tooth-crown, of a porcelain body, a strengthening-ring seated in the body, and a tube of metal baked into said body, and a metal pin adapted to fit into said tube, substantially as and for the purpose described.

4. The combination in a tooth-crown, of a porcelain body, a metal tube passing through the body and secured therein, a pin extending through the tube, a metallic cap-backing fitted to the lingual surface of the body and soldered to the pin, substantially as described.

5. The combination in a tooth-crown, of a porcelain body, a strengthening-ring and a tube both of metal and both seated within the outer walls of said body, a pin extending through the tube, and a metallic cap-backing fitted to the lingual surface of the body and soldered to the end of said pin, substantially as described.

6. In an artificial tooth, a porcelain crown, a tube secured within the crown and open at the lingual side thereof, and a back cap plate shaped to fit the lingual surface of the crown and provided with a pin removably mounted within the tube, substantially as described.

In testimony whereof, I have hereunto set my hand, this 7th day of December, 1908.

HARRISON D. BEST.

Witnesses:
H. M. Corwin,
M. V. Kiehl.